Oct. 4, 1955 W. S. WINFIELD 2,719,916

HIGH FREQUENCY CONVERTER

Filed Oct. 10, 1952

Inventor:
William S. Winfield,
by Merton D. Moore
His Attorney.

United States Patent Office 2,719,916

Patented Oct. 4, 1955

2,719,916

HIGH FREQUENCY CONVERTER

William S. Winfield, Kirkville, N. Y., assignor to General Electric Company, a corporation of New York Application October 10, 1952, Serial No. 314,080

12 Claims. (Cl. 250—20)

Figures 1, 2:
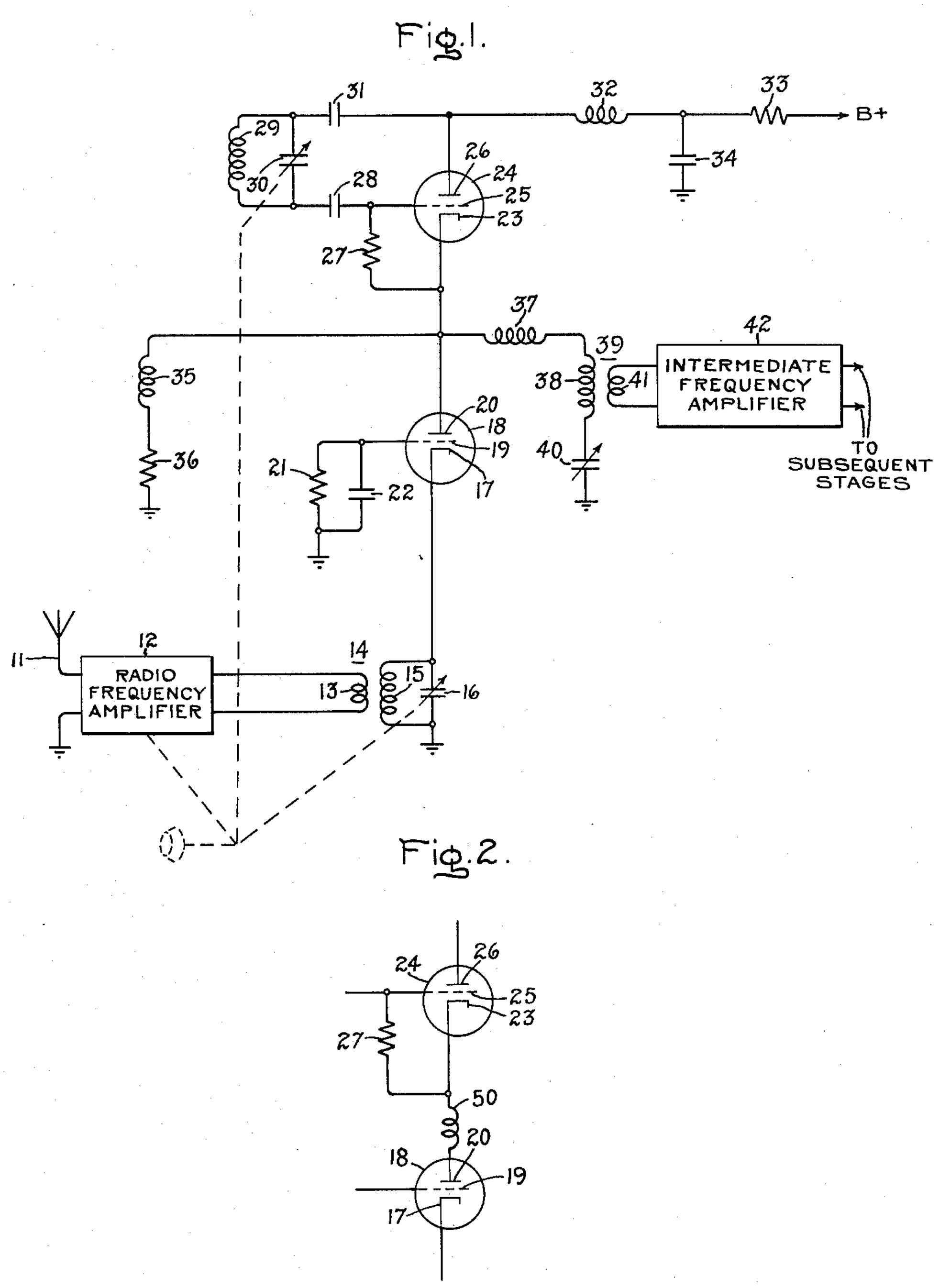

The present invention relates to improvements in frequency converting apparatus and, more particularly, to improvements in frequency converting apparatus of the type suitable for the conversion of signal waves in the very-high-frequency and the ultra-high-frequency regions. The invention has particular application in receiving apparatus of the superheterodyne type for converting very-high-frequency and ultra-high-frequency signal-modulated waves, such as those employed in television broadcasting channels.

In radio and television receivers of the superheterodyne type, an incoming signal-modulated carrier wave is combined with a locally-generated oscillatory wave of a predetermined frequency in a mixer or converter circuit in order to produce a signal-modulated wave of a lower, intermediate frequency that can be more readily amplified and otherwise translated than the higher frequency carrier wave. The intermediate-frequency wave thus produced is a heterodyne or beat-frequency component of the combined waves and is usually determined by the difference between the incoming carrier frequency and the locally generated frequency with which it is mixed or heterodyned.

Various methods of combining waves of different frequencies have been employed. A common method is to apply the signal-modulated carrier voltage and the local oscillator output voltage simultaneously to the same control electrode of an electron discharge device called a mixer.

A difficulty inherent in this type of mixer, having both signal and oscillator voltages applied to the same electrode, is that inter-action tends to occur between the local oscillator and the signal wave, causing the local oscillator to synchronize with strong signal waves. In the very-high-frequency region, and particularly in the ultra-high-frequency region, the local oscillator tends to become overloaded, in which case its output frequency becomes unstable and, as is often the case, oscillations may cease altogether.

Another method commonly used is to combine the local oscillator and the mixer in a single electron discharge device having a plurality of control electrodes. A conventional converter employing this method is the pentagrid converter. In the very-high-frequency region, and again, particularly in the ultra-high-frequency region, with presently available pentagrid tubes, the inter-electrode capacitance of the pentagrid converter tube usually reduces the efficiency of such a device to the point where it fails to operate at all.

By commercial practice, as well as by government regulation, present-day television broadcasting channel allocations extend over a relatively large portion of the frequency spectrum including both the very-high-frequency and the ultra-high-frequency rekions; more specifically, they cover the range from about 54 megacycles to about 890 megacycles. Thus, there is a need for an improved wide-range frequency converter employing conventional electron discharge devices for operation over the entire television range, including both the very-high-frequency and the ultra-high-frequency regions.

It is an object of the present invention to provide an improved frequency converter employing conventional electron discharge devices for combining a signal-modulated carrier wave of the very-high-frequency range or ultra-high-frequency range with a locally-generated oscillation of predetermined frequency.

It is another object of the present invention to provide an improved frequency converting apparatus having a substantially constant conversion gain throughout the entire frequency range presently employed in television systems, namely, from about 54 megacycles to about 890 megacycles.

It is still another object of the present invention to provide an improved frequency converter suitable for operation over both the very-high-frequency and ultra-high-frequency television ranges, and in which a comparatively weak local oscillation will be sufficient to operate the converter.

It is a further object of the present invention to provide an improved series-connected frequency converter in which the high-frequency input circuit may have one terminal connected to ground potential.

It is a still further object of the present invention to provide an improved series-connected frequency converter in which the oscillator plate resistance has substantially no effect on the intermediate-frequency converter output waves.

Briefly stated, in accordance with one aspect of the present invention there is provided an improved frequency converter comprising serially-connected oscillator and mixed devices. More specifically, a mixer electron discharge device including an anode, a cathode and a control electrode is provided with means for injecting a high-frequency signal input wave between its cathode and a common reference point of potential which may be designated ground. In addition, a local oscillator is provided between the mixer-anode and the positive side of a source of operating potential having its negative terminal connected to ground. Output means, including a filter connected between the junction of the mixer-anode and the oscillator-cathode and ground, are provided for deriving a mixer output wave comprising an intermediate-frequency heterodyne component of the signal input wave and the oscillator output wave.

For additional objects and advantages, and for a better understanding of the invention, attention is now directed to the following description and accompanying drawing. The features of the invention which are believed to be novel are particularly pointed out in the appended claims.

In the drawing:

Fig. 1 is a schematic circuit diagram, partly in block form, of the high-frequency portion of a superheterodyne receiving apparatus embodying one form of the present invention. The portion of the circuit which has been omitted is conventional and may be the subsequent stages of either a radio or television receiving apparatus well-known in the art; and Fig. 2 is a schematic circuit diagram of a modified version of a portion of the circuit shown in Fig. 1.

In Fig. 1, an antenna system 11, adapted to receive both very-high-frequency and ultra-high-frequency waves, is connected to a radio-frequency amplifier 12 comprising one or more conventional stages of radio-frequency amplification. The output of the radio-frequency amplifier 12 appears across the primary winding 13 of a coupling transformer 14. The secondary winding 15 of transformer 14 is tuned to resonate at the incoming signal frequency by means of the capacitor 16 connected across its terminals. The parallel resonant circuit comprising inductor 15 and capacitor 16 has one end connected to common ground and the opposite end connected to the cathode 17 of a mixer electron discharge device 18.

Device 18 comprises the cathode 17, a control grid 19 and an anode 20. Grid 19 is connected through a bias resistor 21 to ground. Similarly, a grid by-pass capacitor 22 is connected between grid 19 and ground. The anode 20 of device 18 is directly connected to the cathode 23 of an oscillator electron discharge device 24.

Device 24 is a suitable high-frequency amplifying device and in the instant case comprises an anode 26, a control grid 25 and the cathode 23. Device 24 is connected in a typical high-frequency oscillation circuit of the Colpitts type which utilizes the internal inter-electrode capacity of device 24 as part of its parallel resonant circuit in well-known manner. In particular, the oscillator circuit comprises a grid-bias resistor 27 connected between grid 25 and cathode 23. A grid blocking capacitor 28 is connected between grid 25 and the lower end of the oscillator tuned circuit which comprises inductance 29 and capacitor 30 connected in parallel. The upper end of the oscillator tuned circuit is connected to an anode blocking capacitor 31 which has its other side connected to the anode 26. It is, of course, understood that the parallel resonant circuit comprising inductance 29 and capacitor 30 is resonated with the inter-electrode capacitance of the device 24 at the oscillator circuit frequency in well-known manner. As indicated generally by the dashed lines joining variable capacitor 16 and variable capacitor 30, these two circuit elements may be ganged in conventional manner in order that the incoming signal frequency and the local oscillator frequency may be simultaneously tuned to a predetermined frequency difference which, as is well-known, determines the intermediate-frequency produced. Although not illustrated in detail, the input circuit to the radio-frequency amplifier stages may be ganged in a similar manner.

The anode 26 is connected through a radio-frequency choke 32 to a dropping resistor 33 which, in turn, is connected to the positive side of a source of operating potential (not shown) having its negative side connected to common ground in conventional manner. A by-pass capacitor 34 is preferably provided across resistor 33 to ground in order to maintain the Q of choke 32 which would otherwise be reduced by the presence of resistor 33 in the circuit.

While in the ideal case, the devices 18 and 24 should be selected so that their plate resistance maintains the proper plate voltage on the mixer device 18, in the usual case it is necessary to provide additional means for maintaining the correct mixer-anode voltage. Hence, the junction between anode 20 and cathode 23 is shown connected through a radio-frequency choke coil 35 and a resistor 36 to the common ground. Choke 35 is of proper value to offer high impedance to the intermediate-frequency waves. Resistor 36 is adjusted to provide correct plate voltage for the mixer discharge device 18 by providing a direct current shunt path across the last-mentioned device. It has been found that choke 35 may be eliminated in certain cases where the value of resistor 36 is sufficiently high to offer a high impedance to intermediate-frequency waves.

The junction between anode 20 and cathode 23 is also provided with a connection to a radio-frequency choke coil 37 having a high impedance at the oscillator frequencies. The side of choke 37 remote from the junction between anode 20 and cathode 23 is connected to the primary winding 38 of an output transformer 39. The other side of winding 38 is connected through a tuned capacitor 40 to ground. The secondary winding 41 of transformer 39 is connected to the intermediate-frequency amplifier 42. Primary winding 38 of the output transformer 39 is resonated together with the output circuit capacitance including the tunable capacitor 40 at the intermediate-frequency in order to couple the signal output waves to the intermediate-frequency amplifier.

The intermediate-frequency amplifier 42 may comprise one or more stages of amplification where the signal-modulated intermediate-frequency wave may be intensified and subsequently translated to supply an appropriate signal to the video or audio stages of a television or radio receiving apparatus where it may be applied to a television picture tube or loudspeaker for conversion to picture image or sound, as the case may be.

In operation, radio or television signal-modulated carrier waves in the very-high-frequency or ultra-high-frequency range are intercepted by the antenna system 11 and amplified by the radio-frequency amplifier 12. The radio-frequency amplifier output is coupled by means of the transformer 14 to the parallel resonant circuit comprising the secondary winding 15 and the tunable capacitor 16 in order to introduce the signal-modulated carrier waves in the mixer circuit. This type of injection is commonly known as cathode injection. Since, in the static condition cathode 17 is at ground potential, it is apparent that the potential of cathode 17 with respect to ground fluctuates as the signal input wave. Furthermore, since cathode 17 varies with respect to ground, it likewise varies with respect to the grid 19 and the anode 20. Thus, the anode-cathode conduction of device 18 is controlled by fluctuations in both the grid-cathode voltage and the cathode-anode voltage in conventional manner characteristic of cathode injection.

Locally-generated oscillations are produced in conventional manner by the oscillator including device 24. As described above, the oscillator is of the Colpitts type, but other types of oscillators capable of generating electrical waves over both the very-high-frequency and the ultra-high-frequency ranges may be employed.

The precise method by which the output of the local oscillator is mixed with the incoming signal is not fully understood at present. Due to the difficulties involved in measuring electrical waves in the ultra-high-frequency regions, no precise evaluation has been made of the frequency of electrical waves present in various parts of the circuit. However, in the very-high-frequency region, it is believed that the mixer may be modulated to some extent by the cathode of the oscillator. It is unlikely that this explains the mixer action in the ultra-high-frequency region, particularly in the vicinity of 900 megacycles, where the mixer impedance is relatively low, especially with respect to waves up to the fourth harmonic of the generated wave. In this upper frequency region it is believed that by virtue of having the signal on the oscillator cathode, a certain amount of mixer action occurs in the oscillator itself in accordance with familiar autodyne principles. In any event tests have demonstrated that the circuit does function to demodulate the signals in desired manner.

While the preferred form of the invention has been illustrated in Fig. 1 with a direct connection between the mixer-anode 20 and the oscillator cathode 23, it has been found that in some applications of the circuit stray capacitance to ground may overload the oscillator at certain frequencies, causing a reduced oscillator output. As shown in Fig. 2, losses of this type may be compensated for by connecting a small radio-frequency choke coil 50 between anode 20 and cathode 23.

It is thus apparent that the present invention provides an improved series-connected converter having substantially constant conversion gain over a wide range of frequencies. Due to the cathode injection type of signal input, it has the advantage of providing a signal input voltage whose reference point need not be raised above common ground. Furthermore, since the intermediate-frequency signal output waves are derived across the mixer only with respect to ground, the plate resistance of the oscillator has substantially no effect on the signal output voltage.

While a specific embodiment has been shown and described, it will, of course, be understood that various modifications may be made without departing from the principles of the invention. The appended claims are therefore intended to cover any such modifications within the true spirit and scope of the invention.

What I claim as new and desire to secure by Letters Patent of the United States is:

1. A wave frequency-changing system comprising an electron discharge device including an anode, a cathode and a control electrode, an oscillator directly connected to said anode in series with the discharge path of said device, means for applying a signal-modulated high-frequency carrier wave between said cathode and a common reference point of potential, means for connecting said control electrode to said common reference point, means for applying a source of unidirectional operating potential between said oscillator and said common reference point, and filtering means connected between said anode and said common reference point for deriving a heterodyne wave component of said signal modulated carrier wave and said oscillator output wave.

2. A frequency converter comprising a mixer electron discharge device including an anode, a cathode and a control electrode, an oscillator electron discharge device including an anode, a cathode and a control electrode, means for connecting said mixer anode directly to said oscillator cathode, means for applying a signal-modulated high-frequency carrier wave between said mixer cathode and a common reference point of potential, means for connecting said mixer control electrode to said common reference point, means for applying a source of unidirectional operating potential in series with the electron discharge paths of said discharge devices, and an output filter connected between said mixer anode and said common reference point for deriving a heterodyne wave component of said signal modulated carrier wave and said oscillator output wave.

3. A high-frequency converter comprising a mixer device including an electron discharge device having an anode, a cathode and a control electrode, an oscillation generator including an electron discharge device having an anode, a cathode and a control electrode, said anode of said mixer being directly connected to said cathode of said oscillator, the electron paths of said discharge devices being connected in series circuit relation, a source of unidirectional operating potential in said series circuit, said source having its positive terminal connected to said anode of said oscillator and its negative terminal connected to a common reference point of potential, means for supplying an electric signal between said mixer cathode and said common reference point, and means connected between the junction of said mixer anode and said oscillation generator cathode and said common reference point for deriving from said circuit a heterodyne frequency component of said input signal and the output of said oscillation generator.

4. In a receiver system adapted to receive very-high-frequency and ultra-high-frequency waves, a frequency converter comprising a mixer electron discharge device including an anode, a cathode and a control electrode, an oscillation generator including an electron discharge device having an anode, a cathode and a control electrode, means including a connection between said mixer anode and said oscillator cathode for connecting the discharge paths of said discharge devices in series with one another, a source of unidirectional operating potential having its positive terminal connected to said oscillator anode and its negative terminal connected to a common reference point of potential, means for applying a signal-modulated high frequency carrier wave between said mixer cathode and said common reference point, a grid-biasing network connected between said mixer control electrode and said common reference point, means comprising a filter connected between the junction of said mixer anode and said oscillator cathode and said common reference point of potential for deriving an intermediate-frequency output wave including a heterodyne wave component of said signal modulated carrier wave and said oscillator output wave, and means connected between said mixer anode and said common reference point for adjusting the potential of said mixer anode in respect to said reference point, said last means offering a high impedance to said intermediate-frequency waves.

5. A wave frequency changing system comprising a triode electron discharge device having an anode, a cathode and a control electrode, an oscillator directly connected to said anode in series with the discharge path of said device, means for applying a signal-modulated high-frequency carrier wave between said cathode and a common reference point of potential, a grid-biasing network connected between said control electrode and said common reference point, means for applying a source of unidirectional operating potential between said oscillator and said common reference point, and filtering means connected between said anode and said common reference point for deriving a heterodyne wave component of said signal-modulated carrier wave and said oscillator output wave.

6. A frequency converter comprising a mixer electron discharge device including an anode, a cathode and a control electrode, an oscillator electron discharge device including an anode, a cathode and a control electrode, means for connecting said mixer anode directly to said oscillator cathode, means for applying a signal-modulated high frequency carrier wave between said mixer cathode and a common reference point of potential, a grid-biasing network connected between said mixer control electrode and said common reference point, means for applying a source of unidirectional operating potential in series with the electron discharge paths of said discharge devices, impedance means connected between the junction of said mixer anode and said oscillator cathode and said common reference point for adjusting the potential of said junction with respect to said common reference point, and means comprising an output filter connected between said mixer anode and said common reference point for deriving a heterodyne wave component of said signal-modulated carrier wave and said oscillator output wave.

7. A high-frequency converter comprising a mixer device including an electron discharge device having an anode, a cathode and a control electrode, a high-frequency oscillation generator of the Colpitts type including an electron discharge device having an anode, a cathode and a control electrode, said anode of said mixer being directly connected to said cathode of said oscillator, the electron paths of said discharge devices being connected in series circuit relation, a source of unidirectional operating potential in said series circuit, said source having its positive terminal connected to said anode of said oscillator and its negative terminal connected to a common reference point of potential, means for applying a high-frequency electric signal between said mixer cathode and said common reference point, and means connected between the junction of said mixer anode and said oscillation generator cathode and said common reference point for deriving from said circuit a heterodyne frequency component of said input signal and the output of said oscillation generator.

8. In a receiver system adapted to receive very-high-frequency and ultra-high-frequency waves, the combination of an antenna circuit for receiving a signal-modulated high-frequency carrier wave, a radio-frequency amplifier, a frequency converter comprising a mixer electron discharge device including an anode, a cathode and a control electrode, a high-frequency oscillation generator including an electron discharge device having an anode, a cathode and a control electrode, means including a direct connection between said mixer anode and said oscillator cathode for connecting the discharge paths of said discharge devices in series with one another, a source of unidirectional operating potential having its positive terminal connected to said oscillator anode and its negative terminal connected to a common reference point of potential, means including said radio-frequency amplifier for applying said signal-modulated high-frequency carrier wave between said mixer cathode and said common reference point, means comprising a filter connected between the junction of said mixer anode and said oscillator cathode and said common reference point of potential for deriving an intermediate-frequency output wave including a heterodyne wave component of said signal-modulated carrier wave and said oscillator output wave, and impedance means connected between said mixer-anode and said common reference point for adjusting the potential of said mixer-anode with respect to said common reference point, said impedance means having a high impedance toward waves of the frequency of said intermediate-frequency waves.

9. A wave frequency changing system comprising an electron discharge device including an anode, a cathode and a control electrode, a radio-frequency choke coil, an oscillator connected through said radio-frequency choke coil to said anode, said oscillator being in series with the discharge path of said device, means for applying a signal-modulated high-frequency carrier wave between said cathode and a common reference point of potential, means for connecting said control electrode to said common reference point, means for applying a source of unidirectional operating potential between said oscillator and said common reference point, and filtering means connected between said anode and said common reference point for deriving a heterodyne wave component of said signal modulated carrier wave and said oscillator output wave.

10. A high-frequency converter comprising a mixer device including an electron discharge device having an anode, a cathode and a control electrode, an oscillation generator including an electron discharge device having an anode, a cathode and a control electrode, means for connecting the electron paths of said discharge devices in series circuit relation, said means including a radio-frequency choke coil connected between said mixer anode and said oscillator cathode, a source of unidirectional operating potential in said series circuit, said source having its positive terminal connected to said anode of said oscillator and its negative terminal connected to a common reference point of potential, means for supplying an electric signal between said mixer cathode and said common reference point, and means connected between the junction of said mixer anode and said oscillation generator cathode and said common reference point for deriving from said circuit a heterodyne frequency component of said input signal and the output of said oscillation generator.

11. In a receiver system adapted to receive very-high-frequency and ultra-high-frequency waves, a frequency converter comprising a mixer electron discharge device including an anode, a cathode and a control electrode, an oscillation generator including an electron discharge device having an anode, a cathode and a control electrode, means including a radio-frequency choke coil connected between said mixer anode and said oscillator cathode for connecting the discharge paths of said discharge devices in series with one another, a source of unidirectional operating potential having its positive terminal connected to said oscillator anode and its negative terminal connected to a common reference point of potential, means for applying a signal-modulated high frequency carrier wave between said mixer cathode and said common reference point, a grid-biasing network connected between said mixer control electrode and said common reference point, a filter connected between the junction of said mixer anode and said oscillator cathode and said common reference point of potential for deriving an intermediate-frequency output wave including a heterodyne wave component of said signal modulated carrier wave and said oscillator output wave, and means connected between said mixer anode and said common reference point for adjusting the potential of said mixer anode with respect to said reference point, said last means offering a high impedance to said intermediate frequency waves.

12. A frequency converter comprising a mixer electron discharge device including an anode, a cathode and a control electrode, means for applying a signal-modulated high-frequency carrier wave between said mixer-cathode and a common reference point of potential, means for connecting said mixer control electrode to said common reference point, means for applying suitable operating potentials to the respective electrodes of said mixer device, an oscillator, means for coupling said oscillator to said mixer anode in series with the anode-to-cathode path of said mixer device, and filtering means connected between said mixer anode and said common reference point for deriving a heterodyne wave component of said signal-modulated carrier wave and said oscillator output wave.

References Cited in the file of this patent

UNITED STATES PATENTS

| | | |
|---|---|---|
| 2,266,670 | Winfield | Dec. 16, 1941 |
| 2,568,416 | Scheer | Sept. 18, 1951 |
| 2,583,598 | Salzberg | Jan. 29, 1952 |